United States Patent [19]
Fujita et al.

[11] Patent Number: 5,914,586
[45] Date of Patent: Jun. 22, 1999

[54] POWER SUPPLY

[75] Inventors: Hiroyuki Fujita; Koichi Inoue, both of Kyoto, Japan

[73] Assignee: Rohm Co., Ltd., Kyoto, Japan

[21] Appl. No.: 09/043,998

[22] PCT Filed: Aug. 28, 1997

[86] PCT No.: PCT/JP97/03048

§ 371 Date: Apr. 2, 1998

§ 102(e) Date: Apr. 2, 1998

[87] PCT Pub. No.: WO98/09361

PCT Pub. Date: Mar. 5, 1998

[30] Foreign Application Priority Data

Aug. 29, 1996 [JP] Japan .................................. H8-228075
Aug. 29, 1996 [JP] Japan .................................. H8-228076

[51] Int. Cl.$^6$ ....................................................... H02J 7/00
[52] U.S. Cl. ........................... 320/136; 320/164; 320/134
[58] Field of Search .................................... 320/127, 134,
320/135, 136, 164; 429/61

[56] References Cited

U.S. PATENT DOCUMENTS

| | | | |
|---|---|---|---|
| 5,493,197 | 2/1996 | Eguchi et al. | 320/134 |
| 5,547,775 | 8/1996 | Eguchi et al. | 429/61 |
| 5,703,463 | 12/1997 | Smith | 320/134 |
| 5,705,913 | 1/1998 | Takeuchi et al. | 320/134 |
| 5,742,148 | 4/1998 | Sudo et al. | 320/136 |
| 5,818,201 | 10/1998 | Stockstad et al. | 320/119 |
| 5,841,265 | 11/1998 | Sudo et al. | 320/136 |

FOREIGN PATENT DOCUMENTS

| | | |
|---|---|---|
| 57-69438 | 10/1955 | Japan . |
| 2-188131 | 7/1990 | Japan . |
| 8-214462 | 8/1996 | Japan . |

*Primary Examiner*—Stuart N. Hecker
*Assistant Examiner*—K. Shin
*Attorney, Agent, or Firm*—Nikaido, Marmelstein, Murray & Oram LLP

[57] ABSTRACT

A power supply unit has an overdischarge detection circuit for detecting overdischarge of a power source, an overcurrent detection circuit for detecting overcurrent, and a stopping circuit for stopping overdischarge or overcurrent in accordance with an overdischarge detection signal or an overcurrent detection signal. The power supply unit is further provided with a delay circuit to prevent the overdischarge detection circuit and the overcurrent detection circuit from being activated erroneously by external noises. This delay circuit provides a variable delay time so that the delay time will be longer when overdischarge is detected than when overcurrent is detected. This makes it possible to stop overdischarge and overcurrent without fail.

6 Claims, 5 Drawing Sheets

POWER SUPPLY

TECHNICAL FIELD

The present invention relates to a power supply unit that detects overdischarge and overcurrent of batteries such as lithium-ion cells used as a power source and thereby prevents overdischarge and overcurrent discharge of the batteries.

BACKGROUND ART

A power supply unit that uses batteries as a power source is usually provided with a protection IC (integrated circuit), called a power source monitoring IC, to stabilize the operation of the unit. The protection achieved by this IC includes protection against overdischarge and overcurrent, and such protection requires the use of delay circuits to eliminate external noises.

A block diagram of the principal portions of a conventional power supply unit that uses batteries (such a power supply unit is also referred to as a "battery pack") is shown in FIG. 7. In FIG. 7, numeral 1 represents a power source consisting of one or more batteries (lithium-ion cells), numeral 2 represents a discharge control FET (field-effect transistor), numeral 3 represents an FET control circuit, numeral 5 represents a first delay circuit, numeral 7 represents a second delay circuit, numeral 8 represents an OR circuit, numeral 9 represents a positive output terminal, numeral 10 represents a negative output terminal, and numeral 11 represents an external load connected to the terminals 9 and 10.

Numeral 4 represents a power source monitoring circuit, realized with a comparator, for detecting overdischarge. This circuit 4 monitors the voltage of the power source 1, and, when that voltage drops below a predetermined voltage $V_{ref1}$, it outputs a high level. This output is fed through the first delay circuit 5, that is, with a delay of a predetermined length of time T1, to the OR circuit 8. In response, the OR circuit 8 outputs an OFF signal to the FET control circuit 3 (i.e. the OR circuit outputs a high level). On receiving the OFF signal, the FET control circuit 3 turns off the discharge control FET 2. In this way, the power source 1 is protected against overdischarge.

Numeral 6 represents a power source monitoring circuit for detecting overcurrent. This circuit 6 monitors the current flowing out of the power source 1 by monitoring the voltage appearing across the ON resistance of the discharge control FET 2, and, when that voltage exceeds a predetermined voltage $V_{ref2}$, it outputs a high level. This output is fed through the second delay circuit 7, that is, with a delay of a predetermined length of time T2, to the OR circuit 8. In response, the OR circuit 8 outputs an OFF signal to the FET control circuit 3 (i.e. the OR circuit outputs a high level). On receiving the OFF signal, the FET control circuit 3 turns off the discharge control FET 2. In this way, the power source 1 is protected against overcurrent discharge.

In case of overcurrent, however, the internal impedance of the power source 1 varies in such a way that the voltage of the power source 1 lowers, with the result that the power source 1 is erroneously judged to be in the state of overdischarge. To prevent this, the delay time T1 in the first delay circuit 5 needs to be set longer than the delay time T2 in the second delay circuit 7.

As described above, according to the prior art, the delay time for overdischarge detection and the delay time for overcurrent detection need to be set differently, and therefore it is necessary to provide two separate delay circuits for overdischarge detection and for overcurrent detection with extra cost. Moreover, since delay circuits include capacitors as their circuit elements, the prior art, which requires the use of two delay circuits, inevitably requires larger areas for the IC chip and for the circuit board on which to mount the IC chip. This leads to limitations on the size of batteries that can be used, and thus to the reduction of the capacity of the power source.

In addition, variations of the constants of capacitors or other components from unit to unit result in variations of the delay times, and therefore, in the worst case, the relationship between the delay times of the two delay circuits may even be reversed. In such a case, it is impossible to detect overdischarge and overcurrent correctly.

DISCLOSURE OF THE INVENTION

According to the present invention, a power supply unit having a power source consisting of batteries, an overdischarge detection circuit for detecting overdischarge of the power source and an overcurrent detection circuit for detecting overcurrent is characterized by the provision of a variable-delay-time delay circuit used as delay circuits that need to be added to the overdischarge detection circuit and the overcurrent detection circuit to prevent those circuits from being activated erroneously by external noises.

BEST MODE FOR CARRYING OUT THE INVENTION

Figure 1:
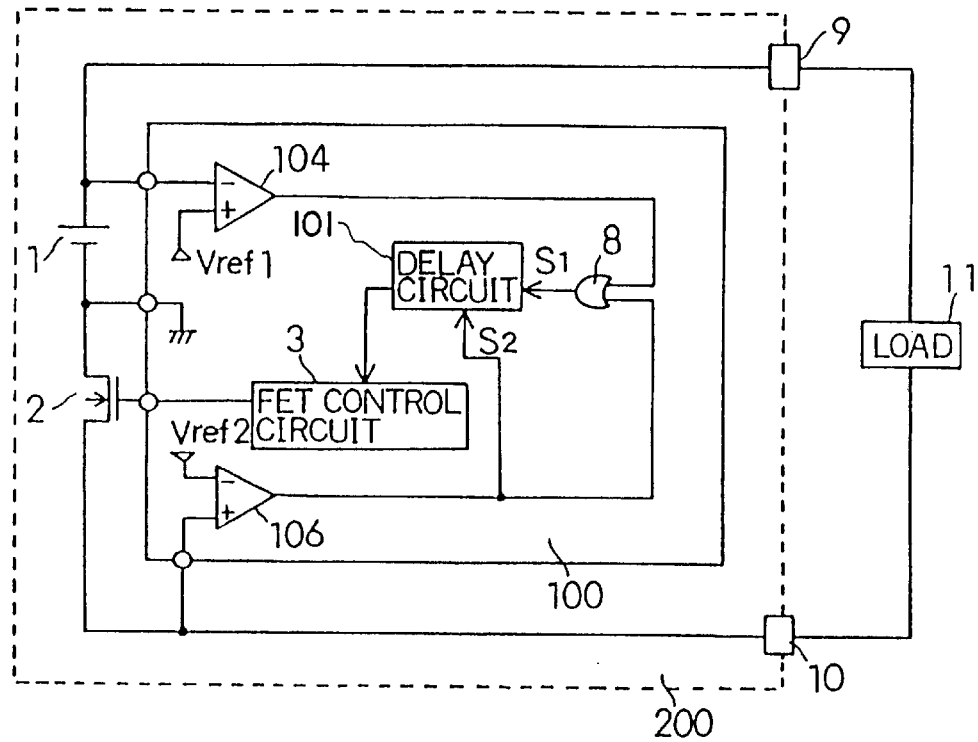
FIG. 1 is a block diagram of a power supply unit embodying the present invention.
Figure 7:
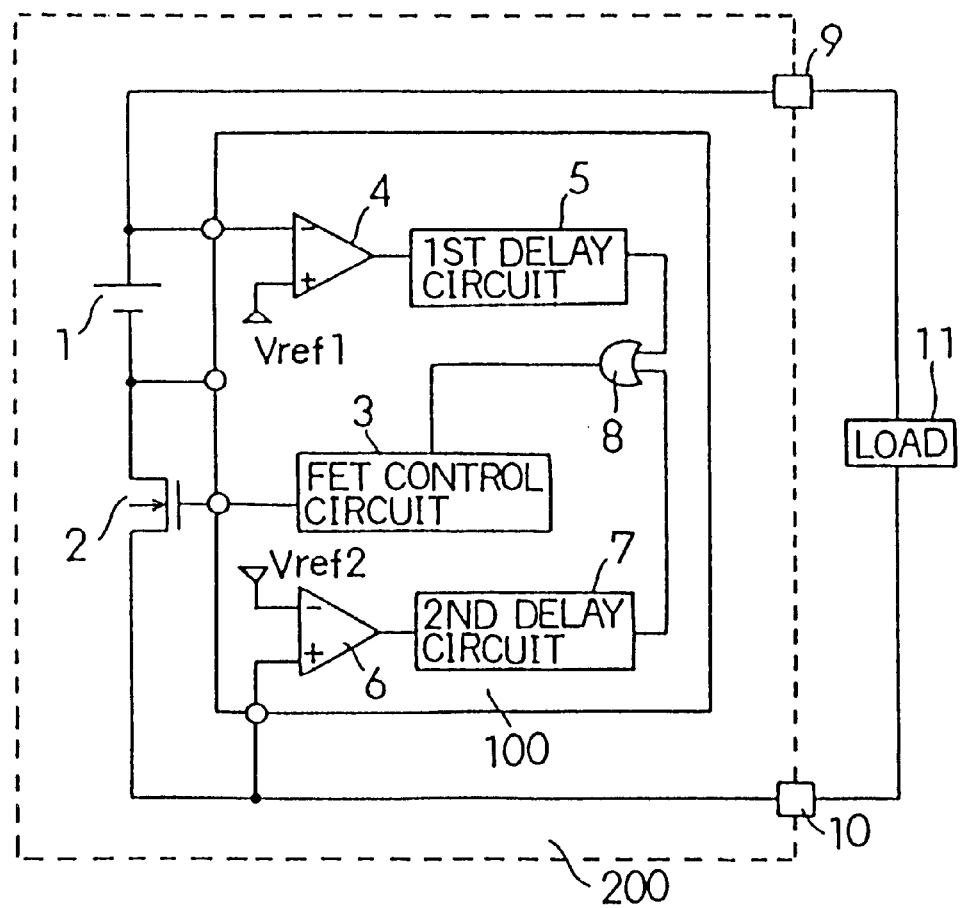
FIG. 7 is a block diagram of a conventional power supply unit.

Hereinafter, embodiments of the present invention will be described with reference to the drawings. FIG. 1 is a block diagram of the principal portions of a power supply unit embodying the present invention. Note that, in FIG. 1 and in the following descriptions, such components as are found also in the prior art shown in FIG. 7 are identified with the same designations, and overlapping explanations will be omitted.

The FET control circuit 3 receives the output of the delay circuit 101. When the delay circuit 101 does not yield an output (i.e. when it outputs a low level), the FET control circuit 3 turns on the discharge control FET 2. When the delay circuit 101 outputs an OFF signal (i.e. when it outputs a high level), the FET control circuit 3 turns off the discharge control FET 2.

The delay circuit 101 is designed to be switchable between two delay times T1 and T2 (T1>T2), and receives, as its first input signal $S_1$, the output of the OR circuit 8 and, as its second input signal $S_2$, the output of the second power source monitoring circuit 6. While the first input signal $S_1$ is low, the delay circuit 101 remains inactive and outputs a low level. Accordingly, in normal condition, that is, as long as no overdischarge or overcurrent is detected by the first or second power source monitoring circuit 4 or 6, the discharge FET 2 is kept on to drive the external load 11.

When the first input signal $S_1$ becomes high, the delay circuit 101 raises its output to a high level at the end of the delay time selected in accordance with the state of the second input signal $S_2$. Specifically, as long as no overcurrent is detected, the second input signal $S_2$ remains low, and the delay time T1 is selected; by contrast, when overcurrent is detected, the second input signal $S_2$ becomes high, and the delay time T2 is selected.

Accordingly, when either overdischarge or overcurrent is detected, the discharge control FET 2 is turned off at the end of the delay time T1 or T2, and thereby the overdischarge or overcurrent is stopped. In addition, since the delay time for overdischarge detection is set longer than the delay time for overcurrent detection, overdischarge and overcurrent can be detected correctly.

Figure 2:
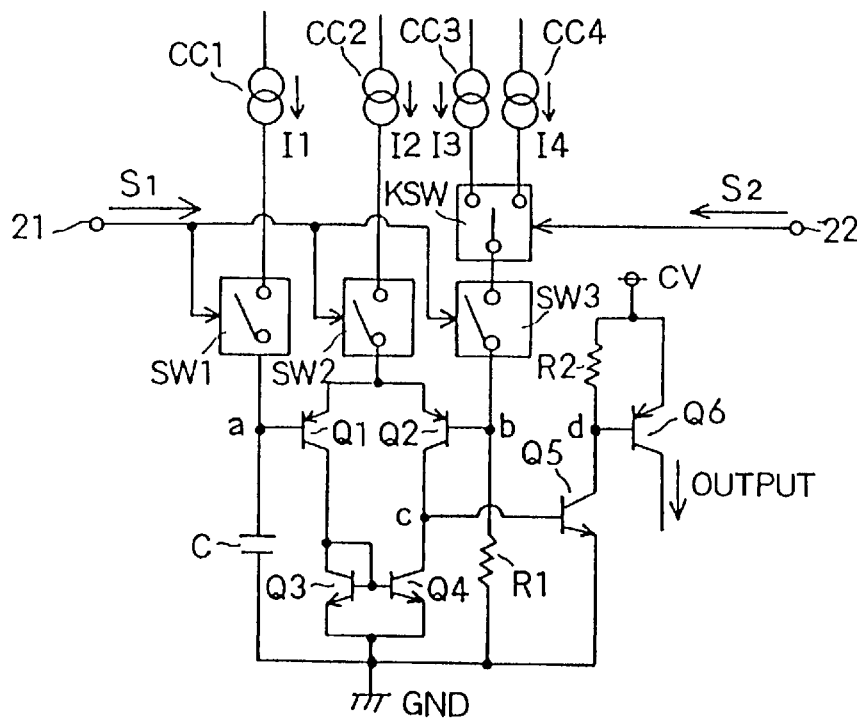
FIG. 2 is a circuit diagram showing an example of the construction of the delay circuit used in the power supply unit of the invention.

FIG. 2 shows an example of the construction of the delay circuit 101. In FIG. 2, numeral 21 represents a first input terminal; numeral 22 represents a second input terminal; CC1, CC2, CC3, and CC4 represent constant current sources that respectively output currents I1, I2, I3, and I4 (I3>I4); Q1, Q2, and Q6 represent pnp-type transistors; Q3, Q4, and Q5 represent npn-type transistors; SW1, SW2, and SW3 represent switching circuits; KSW represents a selecting circuit; R1 and R2 represent resistors; C represents a capacitor; and CV represents a constant voltage source.

The transistors Q1 and Q2 form a differential pair, with their emitters connected through the switching circuit SW2 to the constant current source CC2. The base of the transistor Q1 is connected to the node a, which is connected,, on the one hand, through the switching circuit SW1 to the constant current source CC1 and, on the other hand, to the capacitor C. The other end of the capacitor C is connected to ground. The base of the transistor Q2 is connected to the node b, which is connected, on the one hand, through the switching circuit SW3 and the selecting circuit KSW to two constant current circuits CC3 and CC4 and, on the other hand, to the resistor R1. The other end of the resistor R1 is connected to ground. The collector of the transistor Q1 is connected to the collector and base of the transistor Q3 that serves as the input transistor of a current mirror circuit. The collector of the transistor Q2 is connected to the collector of the transistor Q4 that serves as the output transistor of the current mirror circuit. The emitters of the transistors Q3 and Q4 are connected to ground. When the switching circuit SW2 is turned on and thereby the emitters of the transistors Q1 and Q2 are connected to the constant current source CC2, these transistors Q1 and Q2 are activated to operate as a differential amplifier.

The base of the transistor Q5 is connected to the node c between the collectors of the transistors Q2 and Q4. The collector of the transistor Q5 is connected through the resistor R2 to the constant voltage source CV. The emitter of the transistor Q5 is connected to ground. The base of the transistor Q6 is connected to the node d between the resistor R2 and the collector of the transistor Q5, and the emitter of the transistor Q6 is connected to the constant voltage source CV. The collector of this transistor Q6 serves as the output terminal of the delay circuit 101. The current flowing out of this collector is converted into a voltage by a current-to-voltage conversion circuit (not shown), and is then fed to the FET control circuit 3. It is also possible to drive the FET control circuit 3 directly with the output current without using the current-to-voltage conversion circuit. The transistors Q5 and Q6 and the resistor R2 constitute an output circuit that is connected to the collector of the transistor Q2.

The delay circuit 101 receives its first and second input signals $S_1$ and $S_2$ via the first and second input terminals 21 and 22 respectively. The first input signal $S_1$ from the first input terminal 21 is fed to the switching circuits SW1, SW2, and SW3, and, when the first input signal $S_1$ rises to a high level, the switching circuits SW1, SW2, and SW3 are turned on. On the other hand, the second input signal $S_2$ from the second input terminal 22 is fed to the selecting circuit KSW, and this selecting circuit KSW selects the constant current source CC3 when the second input signal $S_2$ is low and selects the constant current source CC4 when the second input signal $S_2$ is high.

Although, in the above embodiment, the overcurrent detection signal from the second power source monitoring circuit 106 is used as the second input signal $S_2$, it is also possible to use the overdischarge detection signal from the first power source monitoring circuit 104 as the second input signal $S_2$. In this latter case, however, the selecting circuit KSW needs to select the constant current source CC4 when the second input signal $S_2$ is low and select the constant current source CC3 when the second input signal $S_2$ is high.

Having a construction as described above, the delay circuit 101 operates only when overdischarge or overcurrent is detected. Specifically, in such a case, as soon as the base voltage of the transistor Q1 exceeds the base voltage of the transistor Q2, the output current appears at the collector of the transistor Q6. At this time, whereas the base voltage of the transistor Q2 rises abruptly, the capacitor C causes the base voltage of the transistor Q1 to rise gradually, and, in this way, a delay time is created. This delay time can be varied by varying the base voltage of the transistor Q2.

Figure 4:
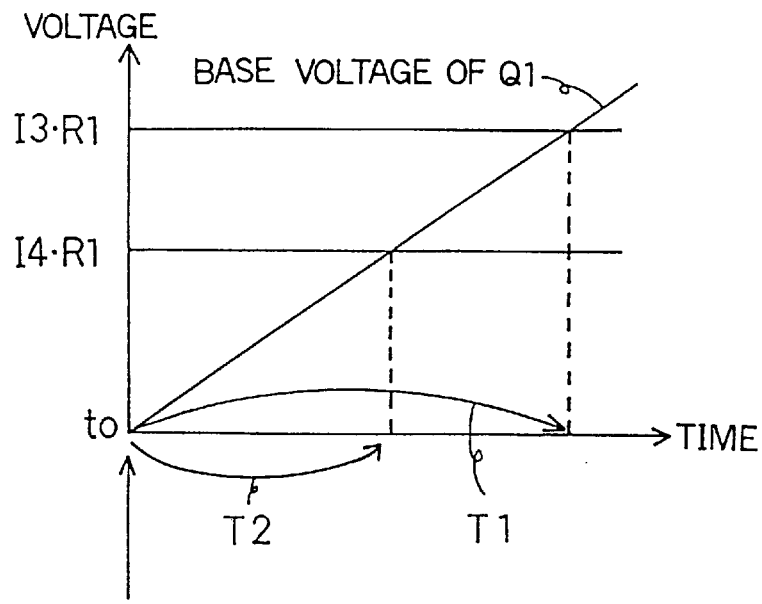
FIG. 4 is a diagram for explaining the difference between the delay times for overdischarge detection and overcurrent detection.

Now, let the resistance of the resistor R1 be R1. Then, the base voltage of the transistor Q2 is I3×R1 when overdischarge is detected, and it is I4×R1 when overcurrent is detected. Since I3>I4, the base voltage of the transistor Q2 is higher when overdischarge is detected than when overcurrent is detected, and accordingly the delay time for overdischarge detection is longer than the delay time for overcurrent detection. FIG. 4 shows the difference between the delay times for overdischarge detection and overcurrent detection. In FIG. 4, $t_0$ indicates the time point when overdischarge or overcurrent is detected, T2 represents the delay time that is created when overcurrent is detected, and T1 represents the delay time that is created when overdischarge is detected.

Even if the capacitance of the capacitor C varies from unit to unit, the delay times for overdischarge and overcurrent vary in the same direction. Accordingly, the relationship between the two delay times never happens to be reversed, and thus it is possible to detect overdischarge and overcurrent correctly.

For example, in the embodiment under discussion, in which one lithium-ion cell (voltage≈3.6 V per cell) is connected, I4×R1 is set to 2.3 V and I3×R1 is set to 3.5 V, so that T1 is longer than T2 by approximately 10 ms.

The present invention is applicable not only to an embodiment as described above, but also to a lithium-ion cell power supply unit in which a charge control FET is inserted between the discharge control FET 2 and the output terminal 10.

Figure 3:
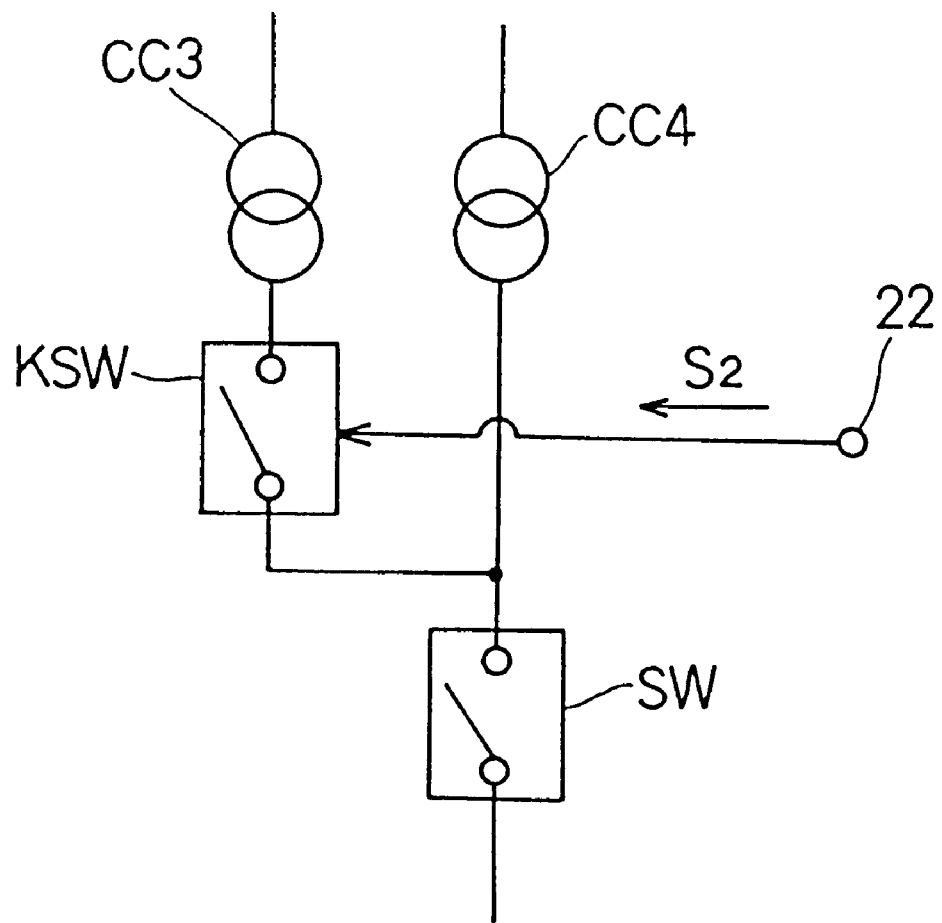
FIG. 3 is a circuit diagram showing a part of a modified example of the construction of the delay circuit shown in FIG. 2.

Moreover, in the delay circuit 101, the constant current sources CC3 and CC4, shown in FIG. 2, for generating the base voltage of the transistor Q2 may be connected as shown in FIG. 3. In that case, the selecting switch KSW is so configured that it is turned off when the second input is high and it is turned on when the second input is low.

The above described power supply unit requires only one delay circuit, and therefore it can be realized with less cost and with a smaller IC chip area. In addition, since a single delay circuit is used to create the delay times for both overdischarge detection and overcurrent detection, even if the delay times vary from unit to unit, the relationship between the two delay times never happens to be reversed, and therefore it is possible to detect overdischarge and overcurrent correctly.

Figure 5:
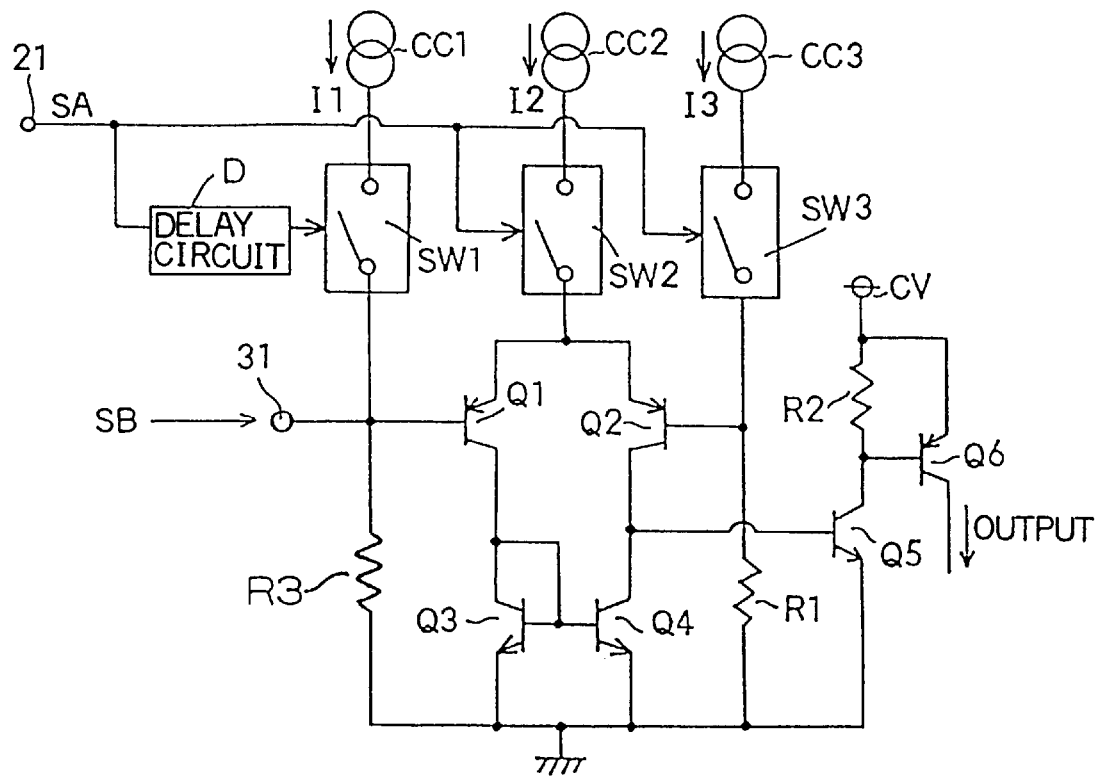
FIG. 5 is a circuit diagram showing an example of the construction of the power source monitoring circuit used in the power supply unit of the invention.

Next, an example of the construction of the power source monitoring circuits 104 and 106 shown in FIG. 1 will be described with reference to FIG. 5. The power source monitoring circuit 104 is for overdischarge detection, and the power source monitoring circuit 106 is for overcurrent detection. These power source monitoring circuits 104 and 106 are realized with a construction similar to that of the delay circuit shown in FIG. 2. Accordingly, in FIG. 5, which shows an example of the construction of the power source monitoring circuit, and in the following descriptions, such components as are found also in FIG. 2 are identified with the same designations, and overlapping explanations will be omitted. Note also that the following descriptions deal with the case where the circuit shown in FIG. 5 is applied to the power source monitoring circuit 106 for overcurrent detection.

The power source monitoring circuit receives, at the input terminal 21, a signal SA, which is, for example, a high-level signal that is generated when the power supply unit 200 returns from an overcurrent or overdischarge state to a stand-by state (the stand-by state refers to a state in which the power supply unit 200 is ready for overcurrent or overdischarge detection). On the other hand, the power source monitoring circuit also receives, at another input terminal 31, a signal SB, which is a voltage that appears across the ON resistance of the FET 2.

The input terminal 21 is connected to the switch SW1 through a delay circuit D. Accordingly, when the input signal SA is received, whereas the switches SW2 and SW3 are turned on immediately, the switch SW1 is turned on with a delay. If this delay circuit D is not provided, the switches SW1, SW2, and SW3 are, theoretically, turned on at the same time. In reality, however, variations of the characteristics of the circuit elements or other factors may cause the base voltage of the transistor Q1 to rise earlier than the base voltage of the transistor Q2, with the result that the transistor Q6 outputs a current that indicates detection of overcurrent. That is, in such a case, even though the input signal SB is not received at the input terminal 31, the overcurrent detection current is outputted erroneously. By contrast, if the delay circuit D is provided as shown in the figure, it causes the base voltage of the transistor Q1 to rise later than the base voltage of the transistor Q2, and thus it prevents erroneous current output that may occur when the power supply unit returns to the stand-by state.

It is possible to omit the delay circuit D by omitting the switches SW1 and SW3 and instead connecting the constant current sources CC1 and CC3 directly to the bases of the transistors Q1 and Q2 and by controlling only the switch SW2 with the input signal SA. However, in that case, the constant current sources CC1 and CC3 need to supply currents I1 and I3 of a few micro-amperes constantly. Quite disadvantageously, this not only increases current consumption, but also aggravates overdischarge of the battery pack and thus deteriorates its characteristics.

When the switch SW1, subsequent to the switches SW2 and SW3, is turned on, the power supply unit enters the stand-by state. In this state, while the signal SB is low enough, the transistor Q6 does not output the overcurrent detection current from its collector, but, when the signal SB exceeds a predetermined value, the transistor Q6 is turned on and outputs the overcurrent detection current. This overcurrent detection current is fed to the delay circuit 101 described previously (FIG. 2). Note that, although the above description deals with the case where the circuit shown in FIG. 5 is applied to the power source monitoring circuit 106 for overcurrent detection, the circuit shown in FIG. 5 is applicable also to the power source monitoring circuit 104 for overdischarge detection.

Figure 6:
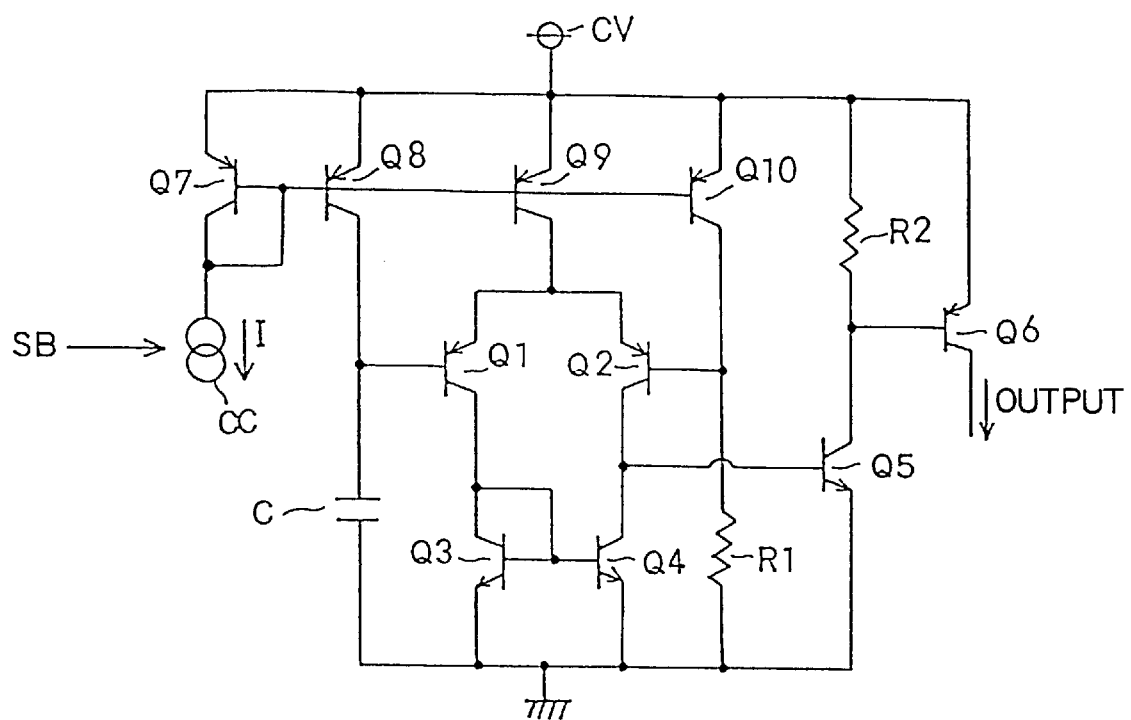
FIG. 6 is a circuit diagram showing another example of the construction of the power source monitoring circuit used in the power supply unit of the invention.

FIG. 6 shows another example of the construction of the power source monitoring circuit shown in FIG. 5. In FIG. 6, CC represents a current source that outputs a current I, Q7 to Q10 are pnp-type transistors whose bases are connected together and whose emitters are connected to a direct-current voltage source CV, and C represents a capacitor for realizing a delay; in addition, such components as are found also in FIG. 5 are identified with the same designations.

In FIG. 6, the transistors Q8, Q9, and Q10 each form a current mirror circuit together with the transistor Q7. In these current mirror circuits, the transistor Q7 serves as the input transistor, and the transistors Q8, Q9, and Q10 each serve as the output transistor. The collector of the transistor Q8 is connected to one end of the capacitor C, and, to this node between the collector of the transistor Q8 and the capacitor C, the base of the transistor Q1 is connected. The other end of the capacitor C is connected to ground. The collector of the transistor Q10 is connected to a resistor R1, and, to this node between the collector of the transistor Q10 and the resistor R1, the base of the transistor Q2 is connected. Further, the emitters of the transistors Q1 and Q2 are connected to the collector of the transistor Q9.

When fed with a control signal that indicates detection of overcurrent or overdischarge, the constant current source CC is turned on and extracts a current I from the input transistor of the above-mentioned current mirror circuits. As a result, the current I starts flowing through the capacitor C and through the resistor R1 at the same time, causing the base voltages of the transistors Q1 and Q2 to rise. Here, if the capacitance of the capacitor C is assumed to be C, then the base voltage of the transistor Q1 rises with a slope I/C.

Accordingly, as long as the capacitance of the capacitor C is determined appropriately, the relationship between the rising times of the base voltages of the transistors Q1 and Q2 can be kept as initially set without the need to supply currents beforehand, and thus erroneous operation of the power source monitoring circuit can be prevented.

The base voltage of the transistor Q1 keeps rising as time passes, and the time it takes to exceed the base voltage of the transistor Q2 is the delay time obtained by the power source monitoring circuit.

In FIGS. 5 and 6, instead of feeding external signals to the power source monitoring circuit, it is also possible to vary the current outputted from the constant current course CC1 in such a way that the relationship between the base voltages of the transistors Q1 and Q2 is reversed at the end of a predetermined length of time.

In the above described power monitoring circuit, an initial state is established not by supplying currents beforehand, but by lengthening the rising time of a base voltage. As a result, this power monitoring circuit never operates erroneously, and in addition reduces the current consumption in an overdischarge state to approximately as low as a leak current (below 1 μA). Thus, it is possible to prevent deterioration of the characteristics of a battery pack.

INDUSTRIAL APPLICABILITY

As described above, according to the present invention, a power supply unit requires only one delay circuit, and therefore it can be realized with less cost and with a smaller IC chip area. In addition, since a single delay circuit is used to create the delay times for both overdischarge detection and overcurrent detection, even if the delay times vary from unit to unit, the relationship between the two delay times never happens to be reversed, and therefore it is possible to detect overdischarge and overcurrent correctly. Accordingly, the present invention is useful in a power supply unit that uses secondary batteries as a power source, in particular in such a power supply unit in which signals indicating detection of overdischarge and overcurrent need to be outputted with different delays, for example a power supply unit having a power source consisting of batteries, an overdischarge detection circuit for detecting overdischarge of the power source, and an overcurrent detection circuit for detecting overcurrent.

We claim:

1. A power supply unit having a power source consisting of a lithium-ion cell, an overdischarge detection circuit for detecting overdischarge of the power source, and an overcurrent detection circuit for detecting overcurrent, further comprising:

a delay circuit that delays outputs of the overdischarge detection circuit and the overcurrent detection circuit, wherein the delay circuit provides different delay times between when overdischarge is detected and when overcurrent is detected.

2. A power supply unit as claimed in claim 1, wherein the delay time is longer when overdischarge is detected than when overcurrent is detected.

3. A power supply unit comprising:

a power source consisting of a charge-and-discharge battery;

a first power source monitoring circuit for monitoring a voltage of the power source in order to output an overdischarge detection signal when the voltage drops below a predetermined voltage;

a second power source monitoring circuit for monitoring a current outputted from the power source in order to output an overcurrent detection signal when the current exceeds a predetermined current;

a delay circuit of a variable delay-time type that delays the overdischarge detection signal and the overcurrent detection signal using a longer delay time when overdischarge is detected than when overcurrent is detected;

stopping means for stopping discharging of the power source; and a control circuit for controlling the stopping means in accordance with an output of the delay circuit.

4. A power supply unit as claimed in claim 3, wherein the delay circuit comprises:

first and second transistors of pnp-type that form a differential pair;

an output circuit connected to a collector of the second transistor;

a capacitor connected between a base of the first transistor and ground to obtain a delay;

a first constant current source connected through a first switch to the base of a first transistor;

a second constant current source connected through a second switch to emitters of the first and second transistors;

a third switch of which one end is connected to a base of the second transistor;

third and fourth constant current sources;

a fourth switch that applies an output of either of the third and fourth constant current sources to the other end of the third switch;

means that, on receiving either the overdischarge detection signal or the overcurrent detection signal, delivers the detection signal to the first, second, and third switches so that those switches are turned on; and means that delivers the overdischarge detection signal or the overcurrent detection signal to the fourth switch to control the fourth switch with the detection signal.

5. A power supply circuit as claimed in claim 3, wherein the first or second power monitoring circuit comprises:

first and second transistors of pnp-type that form a differential pair;

an output circuit connected to a collector of the second transistor;

a first constant current source and a first resistor connected in series;

a second constant current source and a second resistor connected in series;

means that, after a lapse of a predetermined length of time after receiving a stand-by signal for overdischarge and overcurrent detection, makes the first constant current source supply a current to the first resistor; and means that, on receiving the stand-by signal, makes the second constant current source supply a current to the second resistor, wherein a base of the first transistor is connected to a node between the first constant current source and the first resistor, and a base of the second transistor is connected to a node between the second constant current source and the second resistor.

6. A power supply circuit as claimed in claim 3, wherein the first or second power monitoring circuit comprises:

first and second transistors that form a differential pair;

a first constant current source and a capacitor connected in series;

a second constant current source and a resistor connected in series;

means that, on receiving an overdischarge detection signal or an overcurrent detection signal, makes the first constant current source supply a current to the capacitor and makes the second constant current source supply a current to the resistor; and output means connected to a collector of the second transistor, wherein a base of the first transistor is connected to a node between the first constant current source and the capacitor, and a base of the second transistor is connected to a node between the second constant current source and the resistor.

* * * * *